United States Patent Office 3,434,981
Patented Mar. 25, 1969

3,434,981
FIRE-RETARDANT POLYMERS CONTAINING HYDROXYPHOSPHORUS POLYMERS
Charles F. Baranauckas, Memphis, Tenn., and Irving Gordon, Niagara Falls, N.Y., assignors to Hooker Chemical Corporation, Niagara Falls, N.Y., a corporation of New York
No Drawing. Continuation-in-part of application Ser. No. 241,563, Dec. 3, 1962. This application Aug. 4, 1965, Ser. No. 477,299
Int. Cl. C09k 3/28; C08g 33/16
U.S. Cl. 260—2.5
14 Claims

ABSTRACT OF THE DISCLOSURE

A polymeric composition such as a cellulosic material, a polyaddition resin or a polycondensation resin, is rendered fire retardant by the addition thereto of a poly-α-hydroxyorganophosphorus ether formed by reacting a polyol with an organic phosphorus compound selected from the group of phosphorus compounds of the formulae:

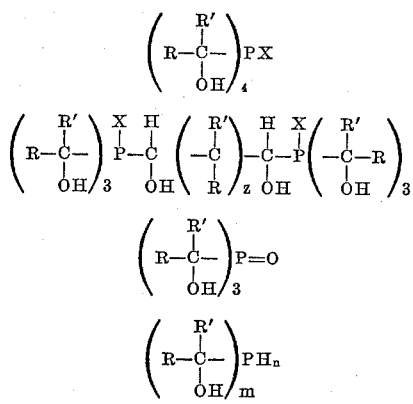

and spirotetrakis(α - hydroxyalkyl)phosphonium salts, wherein R and R' are independently selected from the group consisting of hydrogen, alkyl having between about 1 and 6 carbon atoms, alkenyl having between about 1 and 6 carbon atoms, aryl having between about 5 and 12 carbon atoms, and cycloalkyl having between about 3 and 12 carbon atoms, X is selected from the group consisting of chlorine, bromine, fluorine, iodine, and an organic anion, m is 1 to 3, n is 0 to 2, and m+n=3, and z is from 0 to 6.

---

This application is a continuation-in-part of U.S. patent application Ser. No. 241,563, filed Dec. 3, 1962, now U.S. Patent 3,248,429.

This invention relates to the preparation of organic phosphorus polymers, and uses thereof.

Numerous processes have been developed in which organic phosphorus compounds containing phosphorus linked to a methylol group are polymerized with nitrogen compounds such as ammonia, amines, and the like. Polymeric compositions such as cellulosic textiles are impregnated with such polymers to impart flameproofing properties to the material being treated. When an organic phosphorus halide compound such as tetrakis(hydroxymethyl) phosphonium chloride is used as a reactant in the formation of these polymers, a halogen acid, such as hydrochloric acid is formed as a byproduct of the polymerization reaction. Acids such as these weaken or tenderize the cloth or the cellulosic materials being treated. As a result, one may include with them a hydrogen halide acceptor, such as ammonium hydroxide, amines, and the like, to combine with hydrogen halide during polymerization.

This technique is undesirable because undesirable acidic impurities are retained in the polymer under certain reaction conditions and, also, the use of an acid acceptor adds significantly to the cost of preparing the polymer.

It is an object of this invention to provide a process for preparing polymers of organic phosphorus compounds.

Another object of this invention is to provide novel organic phosphorus polymer compositions.

Still another object of the invention is to provide an improved method for preparing fire-retardant polymeric compositions.

A further object of the invention is to provide an improved method for preparing fire-retardant cellulosic compositions.

A still further object of the invention is to provide polyurethane compositions, especially foamed products, that have excellent fire resistance. These and other objects of the invention will be apparent from the following detailed dscription thereof.

It has been discovered that when tetrakis(α-hydroxyorgano)phosphonium compounds of the formula:

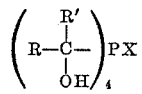

where R, R' and X are as defined below, are reacted with an aliphatic polyol, and heated to a temperature of between about 150 and about 200 degrees centigrade, while a suitable gas is passed through the resulting liquid, a linear poly(α-hydroxyorgano)phosphorus ether is formed having flame-retarding properties. The poly(α-hydroxyorgano)phosphorus ethers formed by this invention may possess one or more ether groupings (—C—O—C—) and one or more hydroxy radicals in addition to the hydroxy radical in the alpha position to the phosphorus.

Organic phosphorus compounds capable of being polymerized in accordance with the instant invention include tetrakis(α-hydroxyorgano)phosphonium halide compounds having the formula:

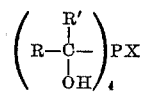

where R and R' are independently selected from the group consisting of hydrogen, alkyl having between about 1 and 6 carbon atoms, alkenyl having between about 2 and 6 carbon atoms, aryl having between about 5 and 12 carbon atoms and cycloalkyl having between about 3 and 12 carbon atoms, and where X is a halogen such as chlorine, bromine, fluorine, or iodine. In this formula, X may also be an organic anion such as formate, acetate, benzoate, and the like.

Typical examples of suitable tetrakis(α-hydroxyorgano) phosphonium compounds are tetrakis(hydroxymethyl) phosphonium chloride, tetrakis(hydroxymethyl)phosphonium bromide, tetrakis(α - hydroxyethyl)phosphonium chloride, tetrakis(α - hydroxypropyl)phosphonium chloride, tetrakis(α-hydroxyallyl)phosphonium chloride, tetrakis(α-hydroxybenzyl)phosphonium chloride, tetrakis(α-hydroxymethylcyclohexyl)phosphonium chloride, and mixtures thereof.

Tertiary phosphine oxide compounds having the formula

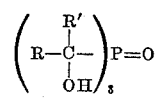

where R and R', are the same or different, and are as described above, may also be polymerized in accordance with the techniques of the instant invention. Typical examples of such suitable tertiary phosphine oxides include tris(hydroxymethyl)phosphine oxide, tris(α-hydroxyallyl)phosphine oxide, tris(α-hydroxybenzyl)phosphine oxide, and mixtures thereof.

Spiro tetrakis(α-hyroxyalkyl)phosphonium salts and the corresponding phosphines and phosphine oxides. Typical examples of suitable spirotetrakis(α-hydroxyalkyl) phosphonium salts include spiro-1,5,7,11-tetrahydroxy-6-phosphazoniahendecane chloride, spiro-1,4,6,9-tetrahydroxy-5-phosphazonianoane chloride, spiro-1,5,7,11-tetrahydroxy-6-phosphazoniahendecane sulfate, spiro-1,5,7,11-tetrahydroxy-6-phosphazoniahendecane hydrogen sulfate, spiro-1,5,7,11-tetrahydroxy-6-phosphazoniahendecane dihydrogen phosphate, spiro-1,5,7,11-tetrahydroxy-6-phosphazoniahendecane nitrate, spiro-1,5,7,11-tetrahydroxy-6-phosphazoniahendecane acetate, and spiro-1,5,7,11-tetrahydroxy-6-phosphazoniahendecane tartrate.

Bis-α-hydroxyphosphonium salts and their corresponding phosphines and phosphine oxides may be utilized in the preparation of the polymers of this invention. The bis-α-hydroxyphosphonium salts suitable for utilization in this invention have the formula:

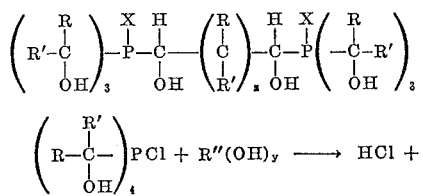

where R and R′ are the same or different, and are as herein described. X is as herein described and z is an integer from 0 to 6. Examples of suitable bis-α-hydroxy phosphonium salts are α,α′-dihydroxyalkylidene-bis(tris-α-hydroxyalkyl)phosphonium halide, α,α′-dihydroxytrimethylene-bis(tri-α-hydroxymethyl)phosphonium chloride, α,α′-dihydroxy trimethylene-bis(tri-α-hydroxyethyl)phosphonium bromide, α,α′-dihydroxytripropylene-bis(tri-α-hydroxymethyl)phosphonium acetate, α,α′-dihydroxy trimethylene-bis(tri-α-hydroxypropyl)phosphonium bromide and the like.

Primary, secondary, and tertiary phosphines of the formula:

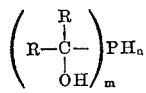

where R and R′ are the same or different, and are as described above, m is 1 to 3, n is 0 to 2, and m+n=3, may may also be polymerized in accordance with the technique of the instant invention. Typical examples of suitable phosphines include tris(hydroxymethyl)phosphine, tris(α-hydroxyethy)phosphine, tris(α-hydroxypropyl)phosphine, tris(α - hydroxyallyl)phosphine, tris(α - hydroxybenzyl)phosphine, and the corresponding primary and secondary phosphines.

Polyols which may be used in accordance with the techniques of the instant invention are pentaerythritol, dipentaerythritol, chlorohydrin, ethylene glycol, propylene glycol, trimethylene glycol, α-butylene glycol, β-butylene glycol, 1,3-butanediol, tetramethylene glycol, isobutylene glycol, 1,5-pentanediol, 3-methyl-1,3-butanediol, pinacol, 2-methyl-2,4-pentanediol, diethylene glycol, dimethylene glycol, dipropylene glycol, 2,2-dimethyl-1,3-butanediol, neopentyl glycol, trimethylolpropane, like polyols, and mixtures thereof.

While the instant invention may be applied to any of the above-mentioned polyols and organic phosphorus compounds, the invention will be described as applied to the above-mentioned pentaerythritol tetrakis(α-hydroxy-organo)phosphonium halide compounds for purposes of clarity.

The tetrakis(α - hydroxyorgano)phosphonium compounds, primary, secondary, and tertiary phosphines and phosphine oxides, the spiro-tetrakis(α-hydroxyalkyl)phosphonium compounds may be prepared by published methods, however, the bis-α-hydroxy phosphonium salts may be prepared by reacting a dialdehyde of the formula $CHO(CH_2)_{0-12}CHO$, phosphine, an aldehyde, and hydrogen chloride.

In the process of the instant invention, the tetrakis(α-hydroxyorgano)phosphonium halide compound is placed in a suitable container, provided with heating means, agitation means, and a means for bubbling an inert gas through the phosphonium halide compound during the polymerization reaction, together with the selected polyol, e.g., pentaerythritol. Byproducts of the polymerization reaction include a hydrogen halide gas, an aldehyde, and water vapor. These gaseous products are carried off from the product by the inert gas being bubbled through the reaction mass. At completion of the reaction, a linear polyether polymer has been formed.

The polymerization reaction of the tetrakis(α-hydroxyorgano)phosphonium compounds may be represented by the following equation.

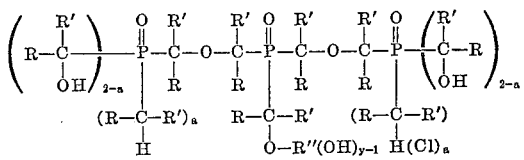

wherein R and R′ are as previously described, R″ is alkyl of 1 to 12 carbon atoms, preferably from 1 to 6 carbon atoms, a is 0 to 1 and y is 1 to 12. It is understood that this formula will vary depending upon the polyol and organic phosphorus compounds employed.

The tetrakis(α-hydroxyorgano)phosphonium halide compound may be added to the reaction vessel as a solid and then subsequently may be melted by heating, or it may be added to the reaction vessel as an aqueous solution. The polyol may be added to the reaction vessel in a similar manner. Of the solutions, it is preferred to utilize one containing from about 50 to about 95 percent by weight of the phosphonium halide compound, but more concentrated or more dilute solutions may be employed if desired. The polyol is added in proportion so as to be from 5 percent to 50 percent by weight of the reaction mixture.

The polymerization reaction is effected by heating the reactants in the reaction vessel to a temperature of between about 100 degrees and about 250 degrees centigrade, until polymerization is substantially complete. When the volume of the byproduct gases of the hydrogen halide, the aldehyde, and water reaches a negligible level in the gas stream coming off the reaction vessel, polymerization is generally substantially complete. A concentration of these byproduct gases in the off-gas stream can readily be determined by conventional techniques. For example, the volume of hydrogen chloride in the gas is readily indicated as being at a low level when moist litmus paper placed in the gas stream is no longer pink. The aldehyde concentration in the off gas is readily determined by the Fuchsin aldehyde test. Generally, substantially complete polymerization is effected between about four and eight hours of reaction, but various suitable polymerization reaction periods which are consistent with commercial operation may be employed.

Gases suitable for passing through the reaction mass during the polymerization reaction include those gases which are inert under the reaction conditions employed, such as hydrogen, nitrogen, carbon dioxide, and mixtures thereof. Sufficient gas may be utilized to carry off substantially all of the gaseous byproducts of the reaction.

It will be recognized by those skilled in the art that rates of gas passage through the reaction mass capable of carrying off a gaseous byproduct may be employed. Generally, a gas rate sufficient to maintain a gas volume of between about 0.5 to about 10 percent of the liquid volume in volumes per minute will give satisfactory results.

The novel polymers provided in accordance with the invention may be used to flameproof polymeric compositions which include cellulosic materials, polyaddition resins, polycondensation resins, and mixtures thereof. For example, the novel polymers may be used in place of phosphonium halide compounds, such as tetrakis(hydroxymethyl)phosphonium chloride, in the preparation of nitrogenphosphorus containing polymers suitable for applying to polymeric compositions, such as cellulosic materials. If desired, the novel polymers of the invention may be applied as aqueous dispersions directly to cellulosic materials, such as paper, textiles, regenerated cellulose fabrics, acetate rayon, and then cured to yield flame-retarding coatings on the material being treated. Alternatively, the cellulosic materials may be impregnated with an aqueous solution of a novel polymer of the invention, whereby from .01 to 50 percent of the polymer is retained by the cellulosic material.

The curing mentioned above is preferably carried out by contacting the polymer treated cellulosic material with a solution of isocyanate and drying the cellulosic material.

Suitable isocyanates include alkylene diisocyanate, such as decamethylene diisocyanate, hexamethylene diisocyanate; 2,4-tolylene diisocyanate, methylenebis(4-phenyl) isocyanate, 4 - chloro-1,3-phenylene diisocyanate, biphenylene diisocyanate, 3,3'-bitolylene-4,4'-diisocyanate, 2-methoxy-1,4-phenylene diisocyanate, diphenylmethane-4,4'-diisocyanate, 3,3'-dimethyldiphenylmethane-4,4'-diisocyanate, also included are the corresponding sulfonyl isocyanates and the isothiocyanates. Conventional means for cure drying may be employed, including air drying, and preferably oven drying for a period of 5 minutes at 150 degrees centigrade.

Further, the novel polymers of the invention are useful in the preparation of fire-retardant polycondensation resins, polyaddition resins, and mixtures thereof. As in the case of cellulosic materials, the novel polymers of the invention may also be applied directly to the resins described above, yielding flame-retardant coatings.

Thus, in accordance with the invention, there are also provided fire-retardant compositions comprising poly-α-hydroxyorganophosphorus ethers formed by heating an organic phosphorus compound selected from the group consisting of (α-hydroxyorgano)phosphonium compounds of formulae

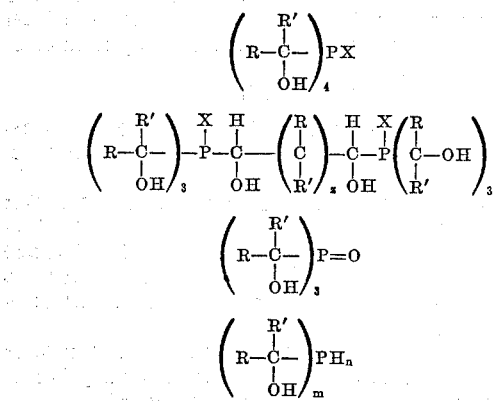

and spiro tetrakis(α-hydroxyalkyl)phosphonium salt, wherein R, R' and X are hereinabove described, $m$ is 1 to 3, $n$ is 0 to 2, and $m+n=3$, and Z is from 0 to 6, and a polyol to a temperature between about one hundred degrees centigrate and about two hundred and fifty degrees centigrate until polymerization is substantially complete, while passing through the reaction mass a gas inert thereto and a polymeric composition selected from the group consisting of cellulosic materials, polyaddition resins, polycondensation resins, and mixtures thereof.

The polycondensation resins include polyurethanes, alkyd resins, epoxy resins, phenolic resins, urea-formaldehyde resins, polyester resins, and the like.

Typically the polyaddition resins include the acrylate resins, vinyl plastics, vinylidene resins, polyethylene, polypropylene, and the like. Illustrative of the polycondensation resins employed with polymers of the invention are the polyurethanes which comprise the reaction products of organic polyisocyanates with hydroxyl-containing polymeric components. If a foamed product is desired, the reaction is carried out in the presence of a foaming agent.

Various organic polyisocyanates can be used in preparing the polyurethane compositions employed by the invention. Among these are 2,4-tolylene diisocyanate, 2,6-tolylene diisocyanate, polymethylene polyphenylisocyanate, and mixtures thereof.

Generally, the hydroxyl-containing polymeric materials have a hydroxyl number between 30 and 1800, and may be selected from the group consisting of:

(1) A polyester comprising the reaction product of a polyhydric alcohol and a polycarboxylic compound,
(2) A polyether comprising the reaction product of a monoepoxide and a compound selected from the group consisting of a polyhydric alcohol, a polyphenolic compound, and a polycarboxylic acid, and
(3) Mixtures thereof.

The following resin formulations are typical hydroxyl-containing polymeric materials that can be used as a component in the polyurethane compositions of this invention.

Resin A:
    1,4,5,6,7,7 - hexachlorobicyclo(2.2.1) - 5-heptene-2,3-dicarboxylic acid, moles_____ 6
    Trimethylolpropane, moles_____ 12
    Acid No._____ <10
    Hydroxyl No._____ 365
Resin B:
    Adipic acid, moles_____ 6
    Trimethylolpropane, moles_____ 10
    Acid No. _____ <1
    Hydroxyl No. _____ 504
Resin C:
    Polypropylene glycol. Molecular weight, about _____ 2000
    Hydroxyl No. _____ 56
Resin D:
    1,4,5,6,7,7-hexachlorobicyclo(2.2.1) - 5 - heptene-2,3-dicarboxylic acid, moles _____ 4
    Glycerol, moles _____ 7.6
    Adipic acid, moles _____ 2
    Acid No. _____ 5
    Hydroxyl No. _____ 265
Resin E:
    Adipic acid, moles _____ 3
    Glycerol, moles _____ 5
    Acid No. _____ 1
    Hydroxyl No. _____ 640
Resin F:
    Trimethylolpropane, mole _____ 1
    Propylene oxide, moles _____ 6
    Hydroxyl No. _____ 392
Resin G:
    Trimethylolpropane, moles _____ 8.8
    Adipic acid, moles _____ 5
    Phthalic anhydride, mole _____ 1
    Acid No. _____ <1
    Hydroxyl No. _____ 435

Resin H:
  1,4,5,6,7,7 - hexachlorobicyclo(2.2.1)-5-heptene-2,3-dicarboxylic acid, mole _____ 1
  Propylene oxide, moles _____ 4
  Adic No. _____ 0
  Hydroxyl No. _____ 202

Any foaming agent commonly used in the art can be employed. They are generally those capable of liberating gaseous products when heated, or when reacted with an isocyanate. Preferably, foaming is accomplished by introducing a low boiling liquid into the urethane components. The heat of reaction is then sufficient to expand the mixture to a foam stable enough to retain its shape until the polymer gels. Suitable liquids are the fluorochlorocarbons boiling in the range of −30 to 50 degrees centigrade and mixtures thereof, for example, trichlorofluoromethane, trichlorotrifluoroethane, and the like.

The novel poly-α-hydroxyorganophosphorus ethers may be suitably added to the unpolymerized polyurethane formulation in percentages ranging from 2 percent to 50 percent, based on total formulation. The more suitable range being from about 7 percent to 25 percent.

In preparing the polyurethane compositions of this invention, the components are preferably reacted in a ratio sufficient to provide about 85 to 115 percent of isocyanato groups with respect to the total number of hydroxyl and carboxyl groups present in the hydroxyl-containing polymeric material, poly-α-hydroxyorganophosphorus ether and the foaming agent, if one is provided. The reaction temperature generally ranges from about 20 to about 180 degrees centigrade, although higher and lower temperatures can be used.

Depending on the feedstocks, the polyurethanes may be used as foams, coating, elastomers, caulks, sealant, castings, and the like.

The following examples illustrate the various aspects of the invention but are not intended to limit it. Where not otherwise specified, temperatures are given in degrees centigrade, parts are by weight.

EXAMPLE 1

Tetrakis(α - hydroxymethyl)phosphonium chloride (3,700 parts) was melted at a temperature of about 100 degrees centigrade with nitrogen sparging. Trimethylolpropane (870 parts) was then added. An exothermic reaction occurred and heating was discontinued. After the exothermic reaction ceased, the mixture was heated, with stirring and nitrogen ebullition, to a temperature of about 175 degrees centigrade for about 6 hours.

A water-soluble, viscous polymeric syrup was recovered, which, when weighed, showed a 32 percent loss of weight from the starting charge. This represents an almost theoretical loss of weight. It analyzed 18.3 percent phosphorus content, and infrared analysis showed the product to be the desired polymer.

EXAMPLE 2

Tetrakis(α - hydroxymethyl)phosphonium chloride (3,700 parts) was melted at a temperature of about 100 degrees centigrade with nitrogen sparging. Pentaerythritol (925 parts) was then added. An exothermic reaction occurred and heating was discontinued. After the exothermic reaction ceased, the mixture was heated, with stirring and nitrogen ebullition, to a temperature of about 175 degrees centigrade for about 6 hours.

A water-soluble, viscous polymeric syrup was recovered. Weight loss found, 37 percent, which was approximately the theoretical for the reaction herein indicated.

EXAMPLE 3

Trishydroxymethyl phosphine oxide (100 parts) and trimethylolpropane (28 parts) were reacted at a temperature of about 170 degrees centigrade with nitrogen sparging. After a slight exothermal evolution of heat, the mixture was heated, with stirring and nitrogen ebullition, for about 2 hours at a temperature of about 175 degrees centigrade.

A water-soluble, viscous polymeric syrup was obtained, which, when weighed, showed a 24 percent loss of weight from the starting charge. This represents an almost theoretical loss of weight. On analysis, it showed 19.1 percent phosphorus content. Infrared analysis verified the identity of the product to be that described earlier.

EXAMPLE 4

Trishydroxymethyl phosphine (6.53 parts) and glycerine (1.63 parts) were reacted with nitrogen sparging. After a slight exothermal evolution of heat, the mixture was heated, with stirring and nitrogen ebullition, for about 3 hours at a temperature of about 165 degrees centigrade.

A water-soluble, viscous polymeric syrup was obtained, which analyzed 20.3 percent phosphorus content. Infrared analysis indicated it to be a linear poly-α-hydroxyalkyl phosphorus ether and reaction weight loss verified this.

EXAMPLE 5

A control polyurethane foam was prepared by heating 10 moles of trimethylolpropane with 6 moles of adipic acid to an almost nil acid number and a hydroxyl number of 504. This polyester was foamed with its own prepolymer. The prepolymer being a mixture of 20 percent of the above polyester and 80 percent of toluene diisocyanate. The mixture of the above two formulations was expanded with trichlorofluoromethane in the normal manner to yield a 2.5 pounds per cubic foot density foam. The fire resistance of this foam, measured by the American Society for Testing Materials D-757 Test, was found to be about 10 inches per minute.

EXAMPLE 6

The polyurethane foam formulation of Example 5 was again prepared, however, 7.5 percent of the tetrakis(α-hydroxymethyl)phosphonium chloride-trimethylolpropane polymer prepared in accordance with Example 1 was added. The fire resistance of the final urethane foam was measured by the method indicated in Example 5. The results of this test showed the fire resistance of the foam was about 0.42 inch per minute. The foam contained 1.38 percent phosphorus and .62 percent chlorine (calculated).

EXAMPLE 7

To the polyurethane formulation of Example 5, 15.2 percent of the tetrakis(α - hydroxymethyl)phosphonium chloride-trimethylolpropane polymer prepared in accordance with Example 1 was added. The fire resistance of the final urethane foam was measured by the American Society for Testing Materials D-757 Test and was found to be a burning rate of .30 of an inch per minute. The foam contained 2.78 percent phosphorus and 1.52 percent chlorine (calculated).

EXAMPLE 8

Example 5 was again repeated to prepare a polyurethane foam, however, it included 7.4 percent of the tetrakis(α - hydroxymethyl)phosphonium chloride pentaerythritol polymer as prepared by Example 2. The foam was then tested for fire resistance by the same method as utilized in testing the foams in Examples 5, 6 and 7, and the burning rate was .43 of an inch per minute. The foam contained 1.4 percent phosphorus and .66 percent chlorine (calculated).

Examples 5, 6, 7, and 8 indicate that the fire resistance is unobviously greatly enhanced by utilizing the polymers prepared by the method hereinabove described.

EXAMPLES 9–12

Three aqueous resin solutions were prepared, employing the polymer of Example 1 in the percentages set forth below in the Table I. Three cloth samples, as described in the table, were each weighed, impregnated with the aqueous resin solution, and then reweighed to determine the percent wet pickup. The wet cloth samples were each heated for two and a half minutes at 120 degrees centigrade to effect drying. Samples 9 and 10 were thereafter impregnated with a solution of 6.5 percent Hylene-M (methylene bis(4-phenyl)isocyanate) dissolved in trichloroethylene. The samples were again weighed to determined wet pickup. Curing of the sample 9 was conducted at 150 degrees centigrade for 5 minutes, the remaining samples 10 and 11, were air dried overnight. The resin impregnated cloth samples, after curing, were weighed again to establish the percent resin add-on. Each resin coated cloth sample was subjected to the standard char test in accordance with procedure of the American Association of Textile Chemists and Colorists, Test AATCC 34–1952. In this test, a strip of cloth to be tested is secured on each of its long sides in a vertical position, leaving an exposed area of approximately ten inches by two and one-quarter inches. A Bunsen burner is positioned below the bottom of the cloth so that the top of the burner is about three-quarters of an inch from the cloth, and so that the burner produces a flame which is about one and one-half inches high. The flame is produced by burning natural gas in the absence of air. The cloth is exposed to the flame for a period of twelve seconds, and the flame is then turned off. The cloth is then removed from the securing means, and a weight is attached to one side of the char, the weight being equivalent to about ten percent of the tear strength of the cloth. The opposite side of the cloth is then pulled to produce a tear along the char. The length of the tear is then measured to determine the char in inches.

An untreated control was also prepared and tested. The results of the tests are set forth in the following table.

| Example and Sample | 9 | 10 | 11 |
|---|---|---|---|
| Percent Solution of Polymer of Example I. | 20 | 20 | Control. |
| Type of Cloth [1] | (2) | (2) | (2). |
| Percent initial wet pick-up | 75 | 74.25 | |
| Percent methylene bis-(4-phenyl)isocyanate in trichloroethylene. | 6.5 | 6.5 | |
| Percent final wet pick-up | 74.52 | 74.25 | |
| Curing | ([3]) | ([4]) | |
| Percent resin add-on | 16.15 | 19.75 | |
| Char in inches | 5.4 | 5.65 | Burns. |

[1] Undyed, heavy cotton twill.
[2] O.D., 8.8 Sateen.
[3] 5 min./300°F.
[4] Room temperature (overnight).

Examples 9 and 10 illustrate the flame-retardance effected by the polymeric compositions of this invention and cellulosic material, as compared to control Experiment 11.

The invention has been described with respect to preferred embodiments thereof but is not to be construed as limited thereto. Variations of the invention may be made and equivalents may be substituted therein without going beyond the invention or the scope of the claims.

What is claimed is:

1. A polymeric composition comprising a polymer selected from the group consisting of cellulosic materials, polyurethanes, alkyd resins, epoxy resins, phenolic resins, urea-formaldehyde resins, polyester resins, acrylate resins, vinyl plastics, vinylidene resins, and polyolefins and between about 2 percent and 50 percent based on the weight of the polymeric composition of a poly-α-hydroxyorganophosphorus ether formed by heating an organic phosphorus compound selected from the group of phosphorus compounds of the formulae

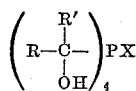

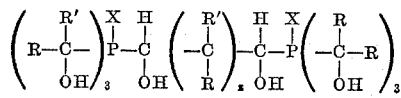

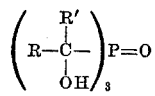

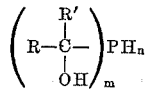

and
spirotetrakis(α-hydroxyalkyl)phosphonium salts, wherein R and R' are independently selected from the group consisting of hydrogen, alkyl having between about 1 and 6 carbon atoms, alkenyl having between about 2 and 6 carbon atoms, aryl having between about 5 and 12 carbon atoms, and cycloalkyl having between about 3 and 12 carbon atoms, and X is selected from the group consisting of chlorine, bromine, fluorine, iodine, and an organic anion, $m$ is 1 to 3, $n$ is 0 to 2, and $m+n=3$, and $z$ is from 0 to 6, with an aliphatic polyol having 2 to 10 carbon atoms, 2 to 6 hydroxyl groups and consisting of elements selected from carbon, hydrogen, oxygen and chlorine, to a room temperature between about one hundred and two hundred and fifty degrees centigrade until polymerization is substantially complete, while passing through the reaction mass a gas inert thereto.

2. A polyurethane composition of components comprising (I) an effective fire-retardant amount of a component formed by heating an organic phosphorus compound selected from the group consisting of phosphorus compounds of formulae

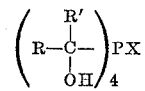

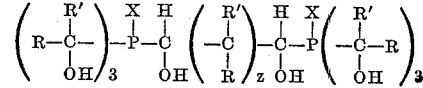

where $z$ is an integer from 0 to 6,

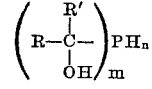

wherein $m$ is 1 to 3, $n$ is 0 to 2, and $m+n=3$,

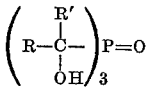

and
spirotetrakis(α-hydroxyalkyl)phosphonium salts, where R and R' are independently selected from the group consisting of hydrogen, alkyl having between about 1 and 6 carbon atoms, alkenyl having between about 2 and 6 carbon atoms, aryl having between about 5 and 12 carbon atoms, and cycloalkyl having between about 3 and 12 carbon atoms, and X is selected from the group consisting of chlorine, bromine, fluorine, iodine, and an organic anion, with an aliphatic polyol having 2 to 10 carbon atoms, 2 to 6 hydroxyl groups and consisting of elements selected from carbon, hydrogen, oxygen and chlorine, to a temperature between about one hundred and about two hundred and fifty degrees centigrade until polymerization is substantially complete, while passing through the reaction mass a gas inert thereto; (II) a hydroxyl-containing polymeric material, said material having a hydroxyl number between 30 and 1800 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof, and (III) an organic polyisocyanate.

3. The polyurethane foam composition of components comprising (I) an effective fire retardant amount of a component formed by heating an organic phosphorus compound selected from the group consisting of phosphorus compounds of formulae

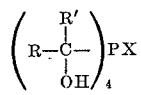

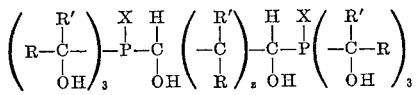

where z is an integer from 0 to 6,

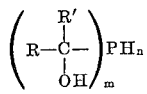

wherein m is 1 to 3, n is 0 to 2, and m+n=3,

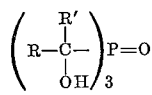

and spirotetrakis(α-hydroxyalkyl)phosphonium salts, where R and R' are independently selected from the group consisting of hydrogen, alkyl having between about 1 and 6 carbon atoms, alkenyl having between about 2 and 6 carbon atoms, aryl having between about 5 and 12 carbon atoms, and cycloalkyl having between about 3 and 12 carbon atoms, and X is selected from the group consisting of chlorine, bromine, fluorine, iodine, and an organic anion, with an aliphatic polyol having 2 to 10 carbon atoms, 2 to 6 hydroxyl groups and consisting of elements selected from carbon, hydrogen, oxygen and chlorine, to a temperature between about one hundred and about two hundred and fifty degrees centigrade until polymerization is substantially complete, while passing through the reaction mass a gas inert thereto; (II) a hydroxyl-containing polymeric material, said material having a hydroxyl number between 30 and 1800 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof; and (III) an organic polyisocyanate; and (IV) a foaming agent.

4. The polyurethane foam composition of claim 3 wherein the organic phosphorus compound has the formula

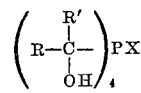

wherein R, R' and X are as defined in claim 3.

5. The polyurethane foam composition of claim 3 wherein the organic phosphorus compound has the formula

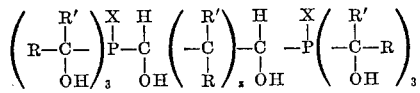

wherein R, R', z and X are as defined in claim 3.

6. The polyurethane foam composition of claim 3 wherein the organic phosphorus compound has the formula

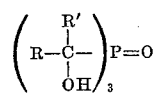

wherein R and R' are as defined in claim 3.

7. A polyurethane foam composition of claim 3 wherein the organic phosphorus compound has the formula

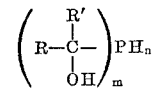

wherein R, R', m and n are as described in claim 3.

8. A polyurethane foam composition of claim 3 wherein the organic phosphorus compound is a spirotetrakis-(α-hydroxyalkyl)phosphonium salt.

9. The polyurethane foam composition of claim 4 wherein the polyol is trimethylolpropane.

10. The polyurethane foam composition of claim 4 wherein the polyol is pentaerythritol.

11. A polyurethane composition comprising (I) a hydroxyl-containing polymeric material having a hydroxyl number between 30 and 1800 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof; (II) an organic polyisocyanate; and (III) a foaming agent; and between about 2 percent and 50 percent based on the total composition of a component prepared by the process comprising heating an organic phosphorus compound selected from the group consisting of phosphorus compounds of formulae

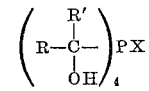

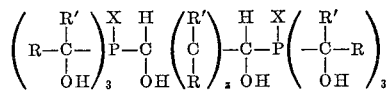

where z is an integer from 0 to 6,

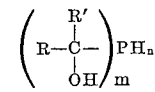

wherein m is 1 to 3, n is 0 to 2, and m+n=3,

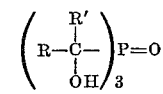

and spirotetrakis(α - hydroxyalkyl)phosphonium salts, where R and R' are independently selected from the group consisting of hydrogen, alkyl having between about 1 and 6 carbon atoms, alkenyl having between about 2 and 6 carbon atoms, aryl having between about 5 and 12 carbon atoms, and cycloalkyl having between about 3 and 12 carbon atoms, and X is selected from the group consisting of chlorine, bromine, fluorine, iodine, and an organic anion, with an aliphatic glycol having 2 to 10 carbon atoms, 2 to 6 hydroxyl groups and consisting of elements selected from carbon, hydrogen, oxygen and chlorine, to a temperature between about one hundred and about two hundred and fifty degrees centigrade until polymerization is substantially complete, while passing through the reaction mass a gas inert thereto.

12. A cellulosic composition having added thereto between about 2 percent and 50 percent of a poly-α-hydroxy-organophosphorus ether formed by heating an organic phosphorus compound selected from the group of phosphorus compounds of the formulae

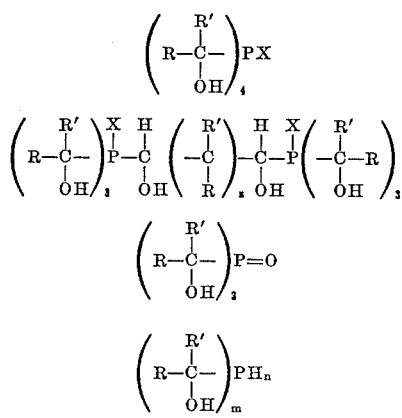

and spirotetrakis(α-hydroxyalkyl)phosphonium salts, wherein R and R' are independently selected from the group consisting of hydrogen, alkyl having between about 1 and 6 carbon atoms, alkenyl having between about 2 and 6 carbon atoms, aryl having between about 5 and 12 carbon atoms, and cycloalkyl having between about 3 and 12 carbon atoms, and X is selected from the group consisting of chlorine, bromine, fluorine, iodine, and an organic anion, $m$ is 1 to 3, $n$ is 0 to 2, and $m+n=3$, and $z$ is from 0 to 6, with an aliphatic polyol having 2 to 10 carbon atoms, 2 to 6 hydroxyl groups and consisting of elements selected from carbon, hydrogen, oxygen and chlorine, to a temperature between about one hundred and two hundred and fifty degrees centigrade until polymerization is substantially complete, while passing through the reaction mass a gas inert thereto.

13. The cellulosic composition of claim 12 wherein the organic phosphorus compound has the formula

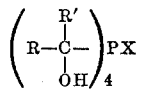

wherein R, R' and X are as defined in claim 12.

14. The cellulosic composition of claim 13 wherein the polyol is trimethylolpropane.

References Cited

UNITED STATES PATENTS

| 2,969,398 | 1/1961 | Buckler | 260—2.5 |
| 3,221,057 | 11/1965 | Gordon et al. | 260—2.5 |

FOREIGN PATENTS

| 676,128 | 12/1963 | Canada. |
| 719,297 | 10/1965 | Canada. |
| 925,570 | 5/1963 | Great Britain. |

OTHER REFERENCES

Condensed Chemical Dictionary, 5th edition, Reinhold (New York), 1956, p. 368.

Dictionary of Organic Compounds, Oxford Press (New York), 1965, pp. 976, 996.

Guthrie et al.: "Application of the THPC Flame-Retardant Process to Cotton Fabrics," 5 pages, reprinted from the May 9, 1955, issue of American Dyestuff Reporter.

Reeves et al.: "Intermediate for Flame-Resistant Polymers," and Engineering Chemistry, vol. 48, No. 1, January 1956, pp. 64 to 67.

DONALD E. CZAJA, *Primary Examiner.*

H. S. COCKERAM, *Assistant Examiner.*

U.S. Cl. X.R.

117—143; 260—13, 59, 71, 75, 87.7, 88.2, 606.5, 45.7

PO-1050
(5/69)

UNITED STATES PATENT OFFICE
CERTIFICATE OF CORRECTION

Patent No. 3,434,981  Dated March 25, 1969

Inventor(s) Charles F. Baranauckas and Irving Gordon

It is certified that error appears in the above-identified patent and that said Letters Patent are hereby corrected as shown below:

Column 2, line 19, the word "dscription" should read ---description---. Column 3, line 50, the formula should appear as follows:

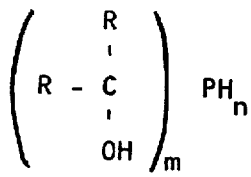

Column 3, line 54, the words "may may also" should read ---may also---. Column 7, line 5, the words "Adic No." should read ---Acid No.----. Column 12, line 66, Claim 11, the words "aliphatic glycol" should read ---aliphatic polyol---.

SIGNED AND
SEALED
JUN 9 1970

(SEAL)
Attest:

Edward M. Fletcher, Jr.
Attesting Officer

WILLIAM E. SCHUYLER, JR.
Commissioner of Patents